United States Patent [19]

Rosenwald

[11] 3,901,666

[45] *Aug. 26, 1975

[54] SYNERGISTIC ANTI-ICING COMPOSITION

[75] Inventor: Robert H. Rosenwald, Western Springs, Ill.

[73] Assignee: Universal Oil Products Company, Des Plaines, Ill.

[ * ] Notice: The portion of the term of this patent subsequent to Sept. 4, 1990, has been disclaimed.

[22] Filed: June 15, 1973

[21] Appl. No.: 370,566

[52] U.S. Cl. .................................. 44/72; 44/DIG. 1
[51] Int. Cl.$^2$ ............................................ C10L 1/20
[58] Field of Search ........................... 44/72, DIG. 1

[56] References Cited
UNITED STATES PATENTS

| | | | |
|---|---|---|---|
| 2,722,099 | 11/1955 | Wasserbach | 44/77 |
| 2,807,525 | 9/1957 | Forman | 44/77 |
| 2,936,223 | 5/1960 | Lovett et al. | 44/77 |
| 3,017,258 | 1/1962 | Pollitzer | 44/72 |
| 3,017,343 | 1/1962 | Pollitzer | 44/72 |
| 3,756,795 | 9/1973 | Rosenwald | 44/72 |

Primary Examiner—Daniel E. Wyman
Assistant Examiner—Y. H. Smith
Attorney, Agent, or Firm—James R. Hoatson, Jr.; Raymond H. Nelson; William H. Page, II

[57] ABSTRACT

A synergistic anti-icing composition comprising a mixture of (1) a polyhydroxy alcohol prepared by the alkylene oxide addition to a polyol and (2) the condensation product from the reaction of an amine with epichlorohydrin.

8 Claims, No Drawings

SYNERGISTIC ANTI-ICING COMPOSITION

BACKGROUND OF THE INVENTION

Many United States patents are issued which describe novel synergistic anti-icing compositions for use in minimizing the stalling of carbureted engines during periods of relatively high humidity and temperatures of from about 30° to about 60° F. The synergistic compositions may include mixtures of alkyl acid phosphate salts of N-alkyl-diaminoalkanes and alkyl acid phosphate salts of alkyl monoamines plus a polyhydroxy alcohol, said polyhydroxy alcohol containing from 2 to about 8 carbon atoms and from 2 to 4 hydroxy groups. However, in many instances, a synergistic anti-icing composition will be useful only in gasolines which possess a relatively high vapor pressure but will not be effective when utilized as an anti-icing composition in gasolines which possess a relatively low vapor pressure. For example, gasolines which may be referred to as winter grade gasolines possess a Reid vapor pressure in the range of from about 12 to about 13 pounds per square inch absolute at 100° F., while summer grade gasolines may be characterized as having a relatively low Reid vapor pressure in the range of from about 8 to about 10 pounds per square inch absolute at 100° F. As will be hereinafter shown in greater detail, it has been found that the novel synergistic anti-icing compositions of the present invention will result in a composition which will effectively raise the stalling times of gasolines which possess a relatively low vapor pressure.

This invention relates to a novel synergistic anti-icing composition which is useful in raising the stalling times of gasolines which possess a relatively low vapor pressure. More specifically the invention is concerned with a novel synergistic anti-icing composition consisting of a mixture of a polyhydroxy alcohol which is prepared by the alkylene oxide addition to a polyol and the condensation product from the reaction of an amine with epichlorohydrin.

As is well known in the art, certain compounds or compositions of matter must be added to gasolines in order to prevent the stalling of internal combustion engines during certain periods of the year. It is well known in the art that gasolines which serve as the fuel for these internal combustion engines are blended so as to provide various characteristics in the summer as compared to the winter. As hereinbefore set forth, gasolines which are used during relatively cold periods will possess a higher vapor pressure than those which are used in periods of relatively warm temperatures in order to provide better ignition. However, in periods of temperature which are intermediate in nature such as those found in the spring and in the fall in certain climates, said temperatures being accompanied by relatively high humidities, it is necessary that anti-icing compositions of matter be added to the gasolines to prevent a stalling of the engine.

It is therefore an object of this invention to provide an anti-icing composition which will prevent the stalling of carbureted engines.

A further object of this invention is to provide an anti-icing composition comprising a mixture of two compounds, said mixture resulting in a synergistic effect of the anti-icing properties.

In one aspect an embodiment of this invention resides in a synergistic anti-icing composition comprising (1) from about 5 percent to about 95 percent by weight of a polyhydroxy alcohol prepared by the alkylene oxide addition to a polyol, said polyhydroxy alcohol containing from about 10 to about 50 carbon atoms and from about 2 to about 10 hydroxyl groups and (2) from about 95 percent to about 5 percent by weight of the condensation product from the reaction of an amine with an epihalohydrin compound.

In another embodiment the present invention relates to gasoline containing an anti-icing concentration of the synergistic composition of matter hereinafter set forth in greater detail.

A specific embodiment of this invention is found in a synergistic anti-icing composition comprising (1) from about 5 percent to about 95 percent by weight of a polyhydroxy alcohol prepared by the propylene oxide addition to a hexane triol and (2) from about 95 percent to about 5 percent by weight of the condensation product from the reaction of hydrogenated tallow amine with epichlorohydrin.

Other objects and embodiments will be found in the following further detailed description of the present invention.

As hereinbefore set forth the present invention relates to a synergistic anti-icing composition comprising a mixture of a polyhydroxy alcohol which is prepared by the alkylene oxide addition to a polyol and the condensation product from the reaction of an amine with an epichlorohydrin compound. As will be hereinafter shown in greater detail, the combination of these components in one composition of matter will exhibit a synergistic effect as relates to the anti-icing characteristics of the mixture when utilized in an effective amount in a gasoline which possesses relatively low vapor pressures, that is, a Reid vapor pressure in the range of from about 8 to about 10 pounds per square inch absolute at 100° F. This synergistic characteristic was totally unexpected in view of the fact that each of the components separately will not exhibit, to any great degree, an increase in the stalling time when applied to the gasoline.

One component of the synergistic anti-icing composition will comprise a polyhydroxy alcohol which is prepared by the alkylene oxide addition to a polyol. A number of the polyhydroxy alcohols prepared via alkylene oxide addition are available commercially. One of these is a polyoxy-propylene polyol available commercially as "NIAX LHT-240" and is prepared by the reaction of a hexane triol with propylene oxide. Analysis shows the product to have a hydroxyl number of 234.6, which corresponds to about 10 moles of propylene oxide per mole of hexane triol. Accordingly, this polyhydroxy alcohol contains an average of 36 carbon atoms and 3 hydroxyl groups per molecule. Another such product is available commercially as "NIAX LHT-550" and is believed to be the mixed polyol resulting from the propylene oxide addition to a mixture of a hexane triol and sorbitol. This polyhydroxy alcohol is said to have a hydroxyl number of about 550, and an acid number of 0.2 maximum and a specific gravity 20/20 of 1.0910. Another polyhydroxyl alcohol which may be used will comprise the propylene oxide addition product to propylene glycol, the propylene oxide addition product to diethylene glycol, the propylene oxide addition product to dipropylene glycol, etc.

While the polyhydroxy alcohols prepared via alkylene oxide addition conveniently are obtained commercially, when desired these may be prepared in any suitable manner. In general, a polyhydroxy hydrocarbon is reacted with an alkylene oxide, including particularly ethylene oxide and propylene oxide, in mole ratios to produce the oxyalkylated polyhydroxy hydrocarbon containing the number of oxyalkyl groups desired. These may range from 1 to 20 and preferably from 5 to 15. The oxyalkylation is effected in any suitable manner and generally is conducted at a temperature of from about room temperature to about 350° F. and preferably from about 200° F. to about 300° F., preferably in the presence of a catalyst such as sodium hydroxide, potassium hydroxide, tertiary amine, quaternary hydroxide, etc. When the oxyalkylation is to be limited to the addition of one oxyalkyl group, the catalyst may be omitted and the reaction is effected in the presence of water. Superatmospheric pressure may be employed which may range from 10 to 1000 pounds or more.

As hereinbefore set forth, the polyhydroxy alcohol for use in the present invention preferably contains from about 10 to about 50 carbon atoms and from 2 to about 10 hydroxyl groups, although it may contain a higher number of carbon atoms, generally not in excess of about 100 carbon atoms, if advantages appear therefor.

The second component of the synergistic anti-icing composition will comprise the condensation product resulting from the reaction of an amine with an epichlorohydrin compound. In the preferred embodiment of the invention, the amine compound which is used as one of the reactants will contain at least 12 carbon atoms and preferably at least 15 carbon atoms. Generally the total number of carbon atoms in the amine will not exceed about 40 carbon atoms per molecule. In a preferred embodiment the amine contains a straight chain of at least 3 carbon atoms attached to the nitrogen atom. In this preferred embodiment, the alkyl group attached to the nitrogen atom is of normal configuration and not secondary, tertiary or of cyclic configuration. However, the alkyl group may contain branching in the chain provided some branching occurs on the fourth carbon atom from the nitrogen atom or further distant therefrom.

Any suitable alkyl amine meeting the requirements hereinbefore set forth may be used to react with the epichlorohydrin compound. In addition to the above requirements, it is essential that the alkyl amine is a primary or secondary amine, that is, only one or two of the hydrogen atoms attached to the nitrogen atom are substituted by alkyl groups. It is to be understood that the term "alkyl amine" as used in the present specification will include primary alkyl amines, polyamines, N-alkyl polyamines, N,N'-dialkyl polyamines, etc.

Illustrative examples of primary alkyl amines include dodecyl amine, tridecyl amine, tetradecyl amine, pentadecyl amine, hexadecyl amine, heptadecyl amine, octadecyl amine, nonadecyl amine, eicosyl amine, heneicosyl amine, docosyl amine, tricosyl amine, tetracosyl amine, pentacosyl amine, hexacosyl amine, heptacosyl amine, octacosyl amine, nonacosyl amine, triacontyl amine, hentriacontyl amine, dotriacontyl amine, tritriacontyl amine, tetratriacontyl amine, pentatriacontyl amine, hexatriacontyl amine, heptatriacontyl amine, octatriacontyl amine, nonatriacontyl amine, tetracontyl amine, etc. Conveniently the long chain amines are prepared from fatty acids or more particularly mixtures of fatty acids formed as products or by-products. Such mixtures are available commercially, generally at lower prices and, as another advantage of the present invention, the mixtures may be used without the necessity of separating individual amines in pure state.

An example of such a mixture is hydrogenated tallow amine which is available under various trade names including "Alamine H26D" and "Armeen HTD." These products comprise mixtures predominating in alkyl amines containing 16 to 18 carbon atoms per alkyl group, although they contain a small amount of alkyl groups having 14 carbon atoms, and also meet the other requirements hereinbefore set forth.

Illustrative examples of secondary amines include N,N'-di-(dodecyl) ethylenediamine, N,N'-di-(tridecyl) ethylenediamine, N,N'-di-(tetradecyl) ethylenediamine, N,N'-di-(pentadecyl) ethylenediamine, N,N'-di-(hexadecyl) ethylenediamine, N,N'-di-(heptadecyl)-1,3-propylenediamine, N,N'-di-(octadecyl)-1,3-propylenediamine, N,N'-di-(nonadecyl)-1,3-propylenediamine, N,N'-di-(eicosyl)-1,3-propylenediamine, etc. In these examples each of the alkyl substituents contains a straight chain of at least 3 carbon atoms attached to the nitrogen atom. In another embodiment, which is not necessarily equivalent, the secondary amine will contain one alkyl group having at least 12 carbon atoms and another alkyl group having less than 12 carbon atoms, both of the alkyl groups having a straight chain of at least 3 carbon atoms attached to the nitrogen atom. Illustrative examples of such compounds include N-propyl-N'-dodecyl ethylenediamine, N-butyl-N'-dodecyl ethylenediamine, N-amyl-N'-dodecyl ethylenediamine, N-butyl-N'-tridecyl ethylenediamine, N-amyl-N'-tridecyl-1,3-propylenediamine, etc., N-propyl-N'-tetradecyl ethylenediamine, N-butyl-N'-tetradecyl-1,3-propylenediamine, N-amyl-N'-tetradecyl-1,3-propylenediamine, etc. Here again the mixtures of secondary amines are available commercially, usually at a lower price, and such mixtures may be used in accordance with the present invention, provided that the amines meet the requirements hereinbefore set forth. An example of such a mixture available commercially is "Armeen 2HT" which consists primarily of dioctadecyl amine and dihexadecyl amine.

Preferred examples of N-alkyl polyamines comprise N-alkyl-1,3-diaminopropanes in which the alkyl group contains at least 12 carbon atoms and a straight chain of at least 3 carbon atoms attached to the nitrogen atom. Illustrative examples include N-dodecyl-1,3-diaminopropane, N-tetradecyl-1,3-diaminopropane, N-hexadecyl-1,3-diaminopropane, N-octadecyl-1,3-diaminopropane, N-eicosyl-1,3-diaminopropane, N-docosyl-1,3-diaminopropane, N-tetracosyl-1,3-diaminopropane, N-hexacosyl-1,3-diaminopropane, N-octacosyl-1,3-diaminopropane, N-triacontyl-1,3-diaminopropane, N-dotriacontyl-1,3-diaminopropane, N-tetratriacontyl-1,3-diaminopropane, N-hexatriacontyl-1,3-diaminopropane, N-octatriacontyl-1,3-diaminopropane, N-tetracontyl-1,3-diaminopropane, etc. As before, mixtures are available commercially, usually at lower prices, of suitable compounds in this class and advantageously are used for the purposes of the present invention. One such mixture is "Duomeen T" which is N-tallow-1,3-diaminopropane and predominates in alkyl groups containing from 16 to 18 carbon atoms each, although the mixture contains a small amount of alkyl groups containing 14 carbon atoms each. Another mixture available commercially is N-coco-1,3-diaminopropane which contains alkyl groups predominating in 12 to 14 carbon atoms each. Still another example is N-soya-1,3-diaminopropane which predominates in alkyl groups containing 18 carbon atoms per group, although it contains a small amount of alkyl groups having 16 carbon atoms.

In addition, it is also contemplated that other suitable N-alkyl ethylenediamines, N-alkyl-1,3-diaminobutanes, N-alkyl-1,4-diaminobutanes, N-alkyl-1,3-diaminopentanes, N-alkyl-1,5-diaminopentanes, N-alkyl-1,4-diaminohexanes, etc. may also be used, although not necessarily with equivalent results. In addition, it is also contemplated within the scope of this invention that polyamines containing 3 or more nitrogen atoms may also be employed such as N-dodecyldiethylene triamine, N-tridecyldiethylene triamine, N-tetradecyldipropylene triamine, N-tridecyldibutylene tetramine, N-tridecyltetraethyl pentamine, etc. In general, it is preferred that the amine compounds are saturated, and that they do not contain double bonds in the chain. However, in some cases, unsaturated compounds may be employed, although not necessarily with equivalent results. Illustrative examples of such amine compounds will include dodecylenic amine, didodecylenyl amine, N-dodecylenic ethylenediamine, octadecadienyl amine, dilinoleic amine, N-octadecadienyl-1,3-diaminopropane, etc.

As hereinbefore set forth, the amine compound is reacted with an epihalohydrin compound. Epichlorohydrin is preferred. Other epichlorohydrin compounds include 1,2-epi-4-chlorobutane, 2,3-epi-4-chlorobutane, 1,2-epi-5-chloropentane, 2,3-epi-5-chloropentane, etc. In general, the chloro derivatives are preferred, although it is understood that the corresponding bromo and iodo compounds may be employed. In some cases epidihalohydrin compounds may be utilized. It is understood that the different epihalohydrin compounds are not necessarily equivalent in the same or different substrate and that, as hereinbefore set forth, epichlorohydrin is preferred.

In general, 1 or 2 moles of amine compound are reacted with 1 or 2 moles of epihalohydrin compound. It is understood that, in some cases, an excess of amine or of epihalohydrin may be supplied to the reaction zone in order to insure complete reaction, the excess being removed subsequently in any suitable manner. When 2 moles of amine are reacted per mole of epihalohydrin compound, the amine may comprise the same or different amine compound.

In the preferred embodiment, a reaction of 1 mole of amine compound with 1 mole of epihalohydrin compound proceeds to the formation of the reaction product. The reaction is first effected at a temperature in the range of from about 20° to about 100° C. and preferably within a range of from about 50° to about 75° C. It is also contemplated within the scope of this invention that a higher temperature range of from about 30° to about 150° C. or more and preferably in a range of from about 50° to about 100° C. may be utilized when the reaction is effected at superatmospheric pressures ranging from 2 to about 100 atmospheres to increase the reaction velocity. Conveniently, the reaction is effected by heating the amine solution in a dilute alcohol at refluxing conditions with stirring followed by gradually adding the epihalohydrin compound thereto and continuing the heating until the reaction is completed. After the initial reaction is completed the remaining reactants may be supplied to the reaction mixture and the reaction is completed at a higher temperature but within the same range hereinbefore set forth. For example, a portion of the amine may be first reacted with the epihalohydrin following which the remaining portion of the amine is added thereto. The resulting polyamines may contain from 3 to about 20 or more recurring units and preferably from 5 to 10 recurring units.

The desired quantity of the alkyl amine and the epihalohydrin compounds may be supplied to the reaction zone and therein reacted, although generally it is preferred to supply one reactant to the reaction zone and then introduce the other reactant stepwise. Thus, usually it is preferred to supply the amine to the reaction zone and to add the epihalohydrin compound stepwise, with stirring. When it is desired to react two different alkyl amines with the epihalohydrin compound, the epihalohydrin compound is supplied to the reaction zone. One of the amines is added gradually, and the reaction completed, followed by the addition of the second alkyl amine. Generally, it is preferred to utilize a solvent and, in the preferred embodiment, a solution of the amine in a solvent and a separate solution of the epihalohydrin compound in a solvent are prepared, and these solutions then are commingled in the manner hereinbefore set forth. Any suitable solvent may be employed, a particularly suitable solvent comprising an alcohol including ethanol, propanol, butanol, etc., 2-propanol being particularly desirable.

Either before or after removal of the condensation product resulting from the reaction of an amine with an epihalohydrin compound from the reaction zone, the product is treated to remove halogen generally in the form of an inorganic halide salt as, for example, the hydrogen halide salt. This may be effected in any suitable manner and generally is accomplished by reacting the product with a strong inorganic base such as sodium hydroxide, potassium hydroxide, etc. to form the corresponding metal halide, the reaction to form the metal halide generally being effected under the same reaction conditions as hereinbefore set forth. After completion of the reaction the metal halide is removed in any suitable manner such as filtering centrifugal separation, etc. It is to be understood that the reaction product is heated at a temperature sufficient to remove alcohol and water, this removal being effected either before or after the treatment to remove the inorganic halide.

The mixture of the polyhydroxy alcohol which is prepared by the alkylene oxide addition to a polyol and the condensation product resulting from the reaction of an amine with epihalohydrin may be used in any suitable proportion which may range from about 5% to about 95 percent, and preferably from about 10 percent to about 90 percent by weight of the condensation product of the amine with the epihalohydrin and from about 95 percent to about 5 percent and preferably from about 90 percent to about 10 percent by weight of the polyhydroxy alcohol.

The amount of the total additive composition which is to be added to the gasoline will be sufficient to effect improved de-icing, and particularly to effect a synergistic de-icing. For economic reasons, the concentration should be as low as practicable and may range from about 0.001 percent to about 0.05 percent by weight and preferably is within the range of from about 0.002 percent to about 0.01 percent by weight of the fuel, based on the polyhydroxy alcohol and the condensation product from the reaction of an amine with the epihalohydrin exclusive of solvent when one is employed. While each of the polyhydroxy alcohol and the condensation product may be added separately to the fuel, it is generally preferred to prepare a composition of the condensation product and the polyhydroxy alcohol of the type hereinbefore set forth in greater detail in the proper concentrations and thereafter add this composition to the fuel in the desired amount. When desired, the mixture of the polyhydroxy alcohol prepared by the alkylene oxide addition to a polyol and the condensation product resulting from the reaction of an amine with an epihalohydrin compound may be prepared as a solution in a suitable solvent such as a paraffinic, armatic and/or naphthenic naphtha or gasoline. When desired, the solvent may comprise an aromatic or paraffinic hydrocarbon and will be selected from those hereinbefore set forth. In such a solution, the mixture comprising the synergistic anti-icing composition will comprise from about 10 percent to about 90 percent and preferably from about 25 percent to about 75 percent of the solution.

The novel additive mixture of the present invention also serves as a corrosion inhibitor, anti-oxidant, synergist, tetraalkyl lead stabilizer, and pre-ignition suppressor. However, when desired, the composition of the present invention may be used along with additional anti-oxidant metal deactivators, detergents, dyes or other additives incorporated in gasoline for specific purposes. When desired, one or more of these additional additives may be admixed with the composition of the present invention and manufactured and used in this manner.

The following examples are given to illustrate the process of this invention which, however, are not intended to limit the generally broad scope of the present invention in strict accordance therewith.

EXAMPLE I

The anti-icing properties were determined in a carburetor icing demonstrating apparatus consisting of a vacuum pump equipped so that cool moisture-saturated air from an ice tower is drawn through a gasoline carburetor. The gasoline sample passes from a fuel reservoir through a flow meter into the carburetor at a rate of 14.4 lb/hr. The air from the ice tower is passed at a flow rate of 14.4 lb/hr. at a temperature of 40° F. The manifold vacuum is 9.5 In. Hg. at the start and 12.5 In. Hg. at the end of the test. Evaporation of the gasoline in the carburetor further cools the cold moist air, with resulting ice formation on the throttle plate. The time in seconds is measured until a drop of 3 In. Hg. vacuum occurs, which indicates stalling conditions.

The fuel which was used in this example is a commercial gasoline which, without an anti-icing additive, reached stalling conditions within about 15 seconds. This gasoline is known as summer grade gasoline and possesses a Reid vapor pressure in the range of from 8 to about 10 pounds per square inch absolute. This is in contrast to gasoline which is known as winter grade gasoline possessing a vapor pressure of from 12 to 13 pounds per square inch absolute and which will normally reach stalling conditions in about 8 seconds.

In one test the polymeric condensation product of epichlorohydrin and N-tallow amine was used as an additive in the gasoline in concentrations of 25, 50 and 100 pmm (parts per million) which gave stalling times of 31.4, 41.2 and 77.5 seconds respectively.

Likewise a polyhydroxy alcohol resulting from the propylene oxide addition to hexane triol which has a hydroxyl number of 234.6 which corresponds to about 10 moles of propylene per mole of hexane triol and which is sold under the name NIAX LHT-240 was used in tests in concentrations of 25, 50 and 100 ppm (all concentrations being expressed as 100 percent active ingredient) gave stalling times of 15.6, 17.8 and 18.8 seconds respectively.

In contrast to the above, a mixture of a 50 percent solution of the polymeric condensation product of epichlorohydrin and the tallow amine and 50 percent of NIAX LHT-240 were blended and used in concentrations of 25 and 50 ppm gave stalling times of 45.5 and 162.8 seconds respectively.

It is thus obvious when a mixture of the condensation product of the reaction between the amine and the epichlorohydrin which was prepared by the propylene oxide addition to hexane triol gave an unexpectedly long stalling time when used in a concentration of 50 ppm than the gasoline. It would be expected that when using 25 ppm each of the condensation product and the polyhydroxy alcohol the expected stalling conditions would be the sum of 31.4 and 15.6 seconds or a total of 46 seconds. In contrast, when using 50 ppm of the synergistic mixture the stalling conditions amounted to a time of 162.8 seconds which is roughly an increase of approximately 4 times the expected stalling conditions. In a similar test in which the polyhydroxy alcohol obtained by the propylene oxide addition to hexane triol was present in an amount corresponding to 20 percent of the condensation product from the reaction of N-tallow amine with epichlorohydrin, the stalling time for a concentration of 25 ppm of the total additive was 92 seconds. This would be approximately twice as long as the stalling time which should be obtained when using a concentration of 25 ppm of the condensation product and 25 ppm of the polyhydroxy alcohol.

EXAMPLE II

In this example one component of the synergistic anti-icing mixture is obtained by condensing N-oleyl-1,3-diaminopropane with epichlorohydrin. The compounds are formed in a manner set forth in the above specification and the resulting polymeric condensation product is admixed with a polyhydroxy alcohol resulting from the propylene oxide addition to hexane triol. The synergistic mixture is prepared so that the composition contains 75 percent by weight of the condensation product and 25 percent by weight of the polyhydroxy alcohol. This mixture is added to gasoline and serves to increase the time before stalling occurs.

EXAMPLE III

A polymeric condensation product resulting from the reaction between tallow amine and epichlorohydrin is hydrogenated to remove all double bonds. Following this, the condensation product is admixed with a polyhydroxy alcohol resulting from the propylene oxide addition to hexane triol. The anti-icing composition of this example will comprise a mixture of 80 percent of the hydrogenated condensation product and 25 percent by weight of the polyhydroxy alcohol. The mixture is dissolved in a toluene solution and is incorporated in a concentration of 50 ppm of a commercial gasoline. The time before stalling of the engine will be greatly increased due to the presence of the synergistic anti-icing composition.

EXAMPLE IV

In like manner when the condensation product resulting from the reaction of N-tallow-1,3-diaminopropane with epichlorohydrin is admixed with a polyhydroxy alcohol resulting from the propylene oxide addition to propylene glycol in an amount so that the mixture comprises 50 percent by weight of the condensation product and 50 percent by weight of the polyhydroxy alcohol, the stalling time of the gasoline will be greatly increased when 25 ppm of this mixture is present.

I claim as my invention:

1. A synergistic anti-icing composition comprising (1) from about 5% to about 95% by weight of a polyhydroxy alcohol prepared by the alkylene oxide addition to a polyol, said polyhydroxy alcohol containing from about 10 to about 50 carbon atoms and from about 2 to about 10 hydroxyl groups and (2) from about 95% to about 5 percent by weight of the condensation product from the reaction of a polyamine selected from the group consisting of N-alkyl polyamine wherein the alkyl group contains from 12 to 40 carbon atoms and N,N'-dialkyl polyamine, wherein the alkyl groups contain from 12 to 40 carbon atoms with an epihalohydrin compound.

2. The composition of claim 1 in which said polyhydroxy alcohol is the propylene oxide addition product to a hexane triol and contains an average of 36 carbon atoms per molecule.

3. The composition of claim 1 in which said polyhydroxyl alcohol is the propylene oxide addition product to propylene glycol.

4. The composition of claim 1 in which said epihalohydrin compound is epichlorohydrin.

5. The composition of claim 1 in which said amine is N-tallow-1,3-diaminopropane.

6. The composition of claim 1 in which said amine is N-oleyl-1,3-diaminopropane.

7. Gasoline containing an anti-icing amount of the synergistic anti-icing composition of claim 1.

8. The gasoline of claim 7 containing the synergistic anti-icing composition in an amount in the range of from about 0.0001 percent to about 0.05 percent by weight of the gasoline.

* * * * *